United States Patent
Sumitomo et al.

(10) Patent No.: US 10,075,921 B2
(45) Date of Patent: Sep. 11, 2018

(54) VEHICLE MOUNTED COMMUNICATION UNIT AND SERVICE PROVISION SYSTEM

(71) Applicant: CLARION CO., LTD., Saitama (JP)

(72) Inventors: Yoshitaka Sumitomo, Saitama (JP); Masahiro Yonemitsu, Saitama (JP)

(73) Assignee: CLARION CO., LTD., Saitama-Shi, Saitama (JP)

( * ) Notice: Subject to any disclaimer, the term of this patent is extended or adjusted under 35 U.S.C. 154(b) by 0 days.

(21) Appl. No.: 15/117,836

(22) PCT Filed: Jan. 16, 2015

(86) PCT No.: PCT/JP2015/051124
§ 371 (c)(1),
(2) Date: Aug. 10, 2016

(87) PCT Pub. No.: WO2015/146233
PCT Pub. Date: Oct. 1, 2015

(65) Prior Publication Data
US 2017/0013559 A1    Jan. 12, 2017

(30) Foreign Application Priority Data
Mar. 28, 2014 (JP) ................. 2014-069031

(51) Int. Cl.
*H04W 52/02* (2009.01)
*H04W 4/04* (2009.01)
(Continued)

(52) U.S. Cl.
CPC ......... *H04W 52/0258* (2013.01); *H04L 67/12* (2013.01); *H04W 4/046* (2013.01);
(Continued)

(58) Field of Classification Search
CPC ............. H04W 52/0258; H04W 4/046; H04W 52/0235; H04W 52/0254; H04L 67/12
See application file for complete search history.

(56) References Cited

U.S. PATENT DOCUMENTS

| 8,195,144 | B2 * | 6/2012 | Doherty | ................. H04W 8/245 |
| | | | | 455/419 |
| 8,712,635 | B2 * | 4/2014 | Hashimoto | ........ G05B 19/0428 |
| | | | | 701/36 |

(Continued)

FOREIGN PATENT DOCUMENTS

| JP | 2003-101459 A | 4/2003 |
| JP | 2003101459 A * | 4/2003 |

(Continued)

OTHER PUBLICATIONS

International Search Report issued for corresponding PCT/JP2015/051124 application.

(Continued)

*Primary Examiner* — Chi H Pham
*Assistant Examiner* — Weibin Huang
(74) *Attorney, Agent, or Firm* — IP Business Solutions, LLC (57) ABSTRACT

A TCU is provided to resolve an abnormal state while minimizing loss of convenience for a user. The TCU which communicates with a server terminal providing service for a vehicle via a mobile telephone network for receiving provision of the service, includes a main control unit, and a communication module for communicating with the mobile telephone network. The main control unit resets an operation state of the communication module when communication for receiving the service is not available.

8 Claims, 5 Drawing Sheets

(51) Int. Cl.
*H04L 29/08* (2006.01)
*H04W 4/029* (2018.01)
*H04W 4/02* (2018.01)

(52) U.S. Cl.
CPC ... *H04W 52/0235* (2013.01); *H04W 52/0254* (2013.01); *H04W 4/028* (2013.01); *H04W 4/029* (2018.02); *Y02D 70/00* (2018.01); *Y02D 70/164* (2018.01)

(56) References Cited

U.S. PATENT DOCUMENTS

| | | | |
|---|---|---|---|
| 2003/0054853 A1 | 3/2003 | Kouchiyama et al. | |
| 2003/0088344 A1* | 5/2003 | Oda | G05D 1/027 701/23 |
| 2006/0197654 A1 | 9/2006 | Kouchiyama et al. | |
| 2009/0291714 A1* | 11/2009 | Kouchiyama | H04W 52/0274 455/574 |
| 2010/0118846 A1 | 5/2010 | Moeller | |

FOREIGN PATENT DOCUMENTS

| | | | |
|---|---|---|---|
| JP | 2004-180218 A | | 6/2004 |
| JP | 2005-300466 A | | 10/2005 |
| JP | 2005300466 A | * | 10/2005 |
| JP | 2005-328140 A | | 11/2005 |
| JP | 2005328140 A | * | 11/2005 |
| JP | 2014-042508 A | | 3/2014 |

OTHER PUBLICATIONS

Written Opinion of the International Search Authority issued for corresponding PCT/JP2015/051124 application.
International Preliminary Report on Patentability issued for corresponding PCT/JP2015/051124 application.
Extended European Search Report mailed by European Patent Office dated Oct. 9, 2017 in the corresponding European patent application No. 15768371.5-1875.
Notice of Reasons for Refusal mailed by Japanese Patent Office dated Nov. 21, 2017 in the corresponding Japanese patent application No. 2014069031.
Notice of Reasons for Refusal mailed by Japan Patent Office dated Feb. 20, 2018 in corresponding Japanese patent application No. 2014-069031.
Extended European Search Report mailed by European Patent Office dated Dec. 8, 2017 in the corresponding European patent application No. 15768371.5-1875.

* cited by examiner

| PORTION WHERE CONNECTION IS FAILED | | RESTORATION OPERATION | RESTORATION OPERATION TIMING |
|---|---|---|---|
| TCU | COMMUNICATION CONTROL UNIT OF COMMUNICATION MODULE | RESET COMMUNICATION MODULE | PROMPTLY |
| NETWORK SIDE | MOBILE TELEPHONE NETWORK (MOBILE BASE STATION) | RESET COMMUNICATION MODULE | WHEN OUT-OF-RANGE CONTINUES FOR PREDETERMINED PERIOD |
| | SERVER TERMINAL | RESET COMMUNICATION MODULE | WHEN CONNECTION FAILURE IS CONTINUOUSLY REPEATED PREDETERMINED NUMBER OF TIMES |

FIG. 5

VEHICLE MOUNTED COMMUNICATION UNIT AND SERVICE PROVISION SYSTEM

TECHNICAL FIELD

The present invention relates to a vehicle mounted communication terminal and a service provision system.

BACKGROUND ART

As a background art in a technical field of the present invention, there is Japanese Patent Laid-Open No. 2005-300466 (Patent Literature 1). This patent literature discloses that "an operation state grasping means 4 grasps the operation state of an application executed by an on-vehicle information terminal device 2, and an abnormal state detection means 5 detects the application in an abnormal state according to the operating state of the application. A reset timing calculation means 6 resets the on-vehicle information terminal device 2 in response to detection of the application of the abnormal state".

CITATION LIST

Patent Literature

Patent Literature 1: Japanese Patent Laid-Open No. 2005-300466

SUMMARY OF INVENTION

Technical Problem

Since, in Patent Literature 1, the on-vehicle information terminal device itself is reset, a user cannot utilize the device until operation is started, which leaves room for improvement of convenience.

Therefore, an object of the present invention is to provide a vehicle mounted communication unit which can resolve an abnormal state while minimizing loss of convenience for a user, and a service provision system.

Solution to Problem

This specification incorporates entire content of Japanese Patent Application No. 2014-069031 filed on Mar. 28, 2014.

To achieve the above-described object, a vehicle mounted communication unit which communicates with a server terminal providing service for a vehicle via a mobile communication network for receiving provision of the service, includes a control unit and a communication module performing communication through the mobile communication network, and the control unit resets an operation state of the communication module when communication for receiving the service is not available.

Advantageous Effects of Invention

According to the present invention, it is possible to provide an effect of being capable of resolving an abnormal state while minimizing loss of convenience for a user.

DESCRIPTION OF EMBODIMENTS

An embodiment of the present invention will be described below with reference to the drawings.

Figure 1:
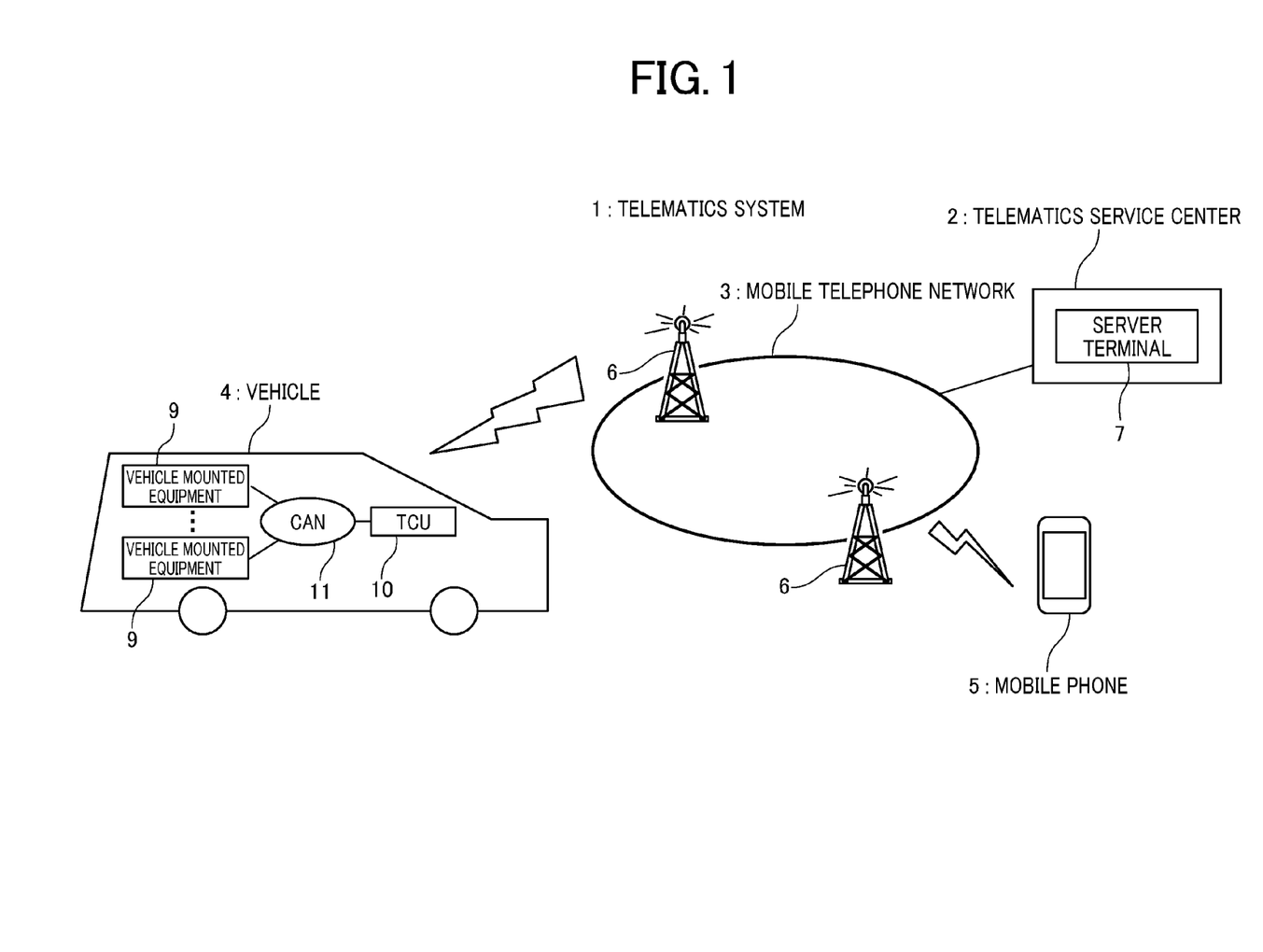
FIG. 1 is a schematic diagram illustrating a configuration of a telematics system according to an embodiment of the present invention.

FIG. 1 is a schematic diagram illustrating a configuration of a telematics system 1 according to the present embodiment.

This telematics system 1 is a service provision system which includes a telematics service center 2, a mobile telephone network 3, a vehicle 4 and a mobile phone 5, and in which the telematics service center 2, the vehicle 4 and the mobile phone 5 transmit/receive data in both directions through the mobile telephone network 3, and the telematics service center 2 provides telematics service to the vehicle 4 and the mobile phone 5. The telematics service refers to various kinds of service provided to the vehicle 4 or a passenger (user) of the vehicle 4 (hereinafter, referred to as "service for a vehicle") by the mobile telephone network 3 being connected to the vehicle 4. This telematics system 1 provides information provision service and remote operation service as the service for a vehicle.

The information provision service is service of the telematics service center 2 distributing various kinds of information to vehicle mounted equipment 9 of the vehicle 4 or the mobile phone 5 of the user through the mobile telephone network 3.

Information distribution service to be distributed to the vehicle mounted equipment 9 can include, for example, content distribution service such as distribution of traffic information, weather, news and e-mail.

Information distribution service to be distributed to the mobile phone 5 of the user can include, for example, battery related information distribution service and vehicle tracking service.

The battery related information distribution service is service of distributing information relating to a state of a battery for vehicle driving mounted on the vehicle 4 to the mobile phone 5 of the user. The information relating to the battery can include, for example, a remaining battery level, an alarm of shortage of a remaining battery level, a battery charging completion notification upon charging of a battery, or the like. Concerning this battery related information distribution service, distribution of the information relating to the battery is triggered when the user requests information distribution from the mobile phone 5 or when the vehicle mounted equipment 9 in which battery state monitoring means is mounted notifies the user based on a charging state of the battery (so-called push delivery). When the telematics service center 2 receives a request for information distribution from the mobile phone 5, the telematics service center 2 requests the vehicle mounted equipment 9 in which the battery state monitoring means is mounted to transmit battery state information and distributes the battery state information received in response to the request to the mobile phone 5. Further, when the telematics service center 2 receives a transmission request of battery charging information from the vehicle mounted equipment 9 of the vehicle 4 to the mobile phone 5, the telematics service center 2 distributes the battery charging information to the mobile phone 5 of the user.

It should be noted that the battery for vehicle driving can include a battery for supplying power to an engine or an electric component in an automobile which uses the engine as a power source, as well as a battery for motor driving mounted on an electric vehicle or a hybrid vehicle which uses an electric motor as a power source.

The vehicle tracking service is service which enables the user to track a location of the vehicle 4 using the mobile phone 5. In this vehicle tracking service, the telematics service center 2 monitors the location of the vehicle 4 by regularly acquiring location information of the vehicle 4 from the vehicle mounted equipment 9 in which own vehicle location detecting means such as GPS is mounted and notifies the user by returning the location of the vehicle 4 in response to a request from the mobile phone 5. By utilizing this vehicle tracking service, the user can track the location of the vehicle 4 when, for example, the vehicle is stolen.

The remote operation service is service which enables the user to remotely operate an electric component (for example, a car air-conditioner) or the vehicle mounted equipment 9 (for example, car navigation) of the vehicle 4 using the mobile phone 5. In this remote operation service, when the telematics service center 2 receives a request for remote operation from the mobile phone 5, the telematics service center 2 transmits a vehicle control command for remotely operating the electric component or the vehicle mounted equipment 9 to be operated to the vehicle 4 to perform remote operation. Further, the telematics service center 2 receives an operation result (for example, whether or not the operation is normally completed, or the like) of the remote operation from the vehicle 4 and distributes the operation result to the mobile phone 5 to notify the user of a result of the remote operation.

By utilizing this remote operation service, the user can perform operation such as activation of a car air-conditioner in advance before the user gets on the vehicle 4.

Each unit of the telematics system 1 will be described in detail next.

The mobile telephone network 3 is a telecommunication line which includes a plurality of mobile base stations 6 provided over a wide area, and provides phone call service and data communication service to the mobile phone 5 through these mobile base stations 6.

The mobile phone 5 is a portable terminal having a function for performing data communication through the mobile telephone network 3, and as this mobile phone 5, a so-called multifunctional mobile terminal (smartphone) having an Internet browser function is suitably used.

It should be noted that, in this telematics system 1, in order to enable the user to receive service using the mobile phone 5, the mobile telephone network 3 is used as a data communication network between the vehicle 4 and the telematics service center 2. In other words, it is also possible to use an arbitrary mobile communication network according to a terminal used by the user for utilizing service and a data communication form of the vehicle 4 in place of the mobile telephone network 3 or in conjunction with the mobile telephone network 3, or use a fixed communication network such as the Internet in conjunction with the mobile telephone network 3.

The telematics service center 2 is a facility having a server terminal 7 which centrally manages and controls provision of the above-described telematics service.

The server terminal 7 is a computer terminal which performs mutual communication with each of the mobile phone 5 and the vehicle 4 through the mobile telephone network 3 and includes at least the following functions. That is, the server terminal 7 has a function of accepting a service provision request from each of the mobile phone 5 and the vehicle 4, and a function of communicating with both or either of the vehicle 4 and the mobile phone 5 in response to the service provision request. The service provision request requested by the mobile phone 5 can include the above-described information distribution request and remote operation request. Further, the service provision request requested by the vehicle 4 can include regular transmission of an own vehicle location to be provided to monitor the vehicle location and a request for distributing battery related information.

The vehicle 4 includes a TCU 10, a CAN 11 and the above-described vehicle mounted equipment 9.

The TCU 10 is a vehicle mounted communication unit which is a so-called Telematics Control Unit, which communicates with the server terminal 7 of the telematics service center 2 through the mobile telephone network 3.

The CAN 11 is a vehicle mounted network which is called a Controller Area Network, and mutual communication is performed by the vehicle mounted equipment 9, the electric component such as the ECU and a vehicle mounted sensor (only the vehicle mounted equipment 9 is illustrated in FIG. 1) and the TCU 10 being connected to this CAN 11.

Figure 2:
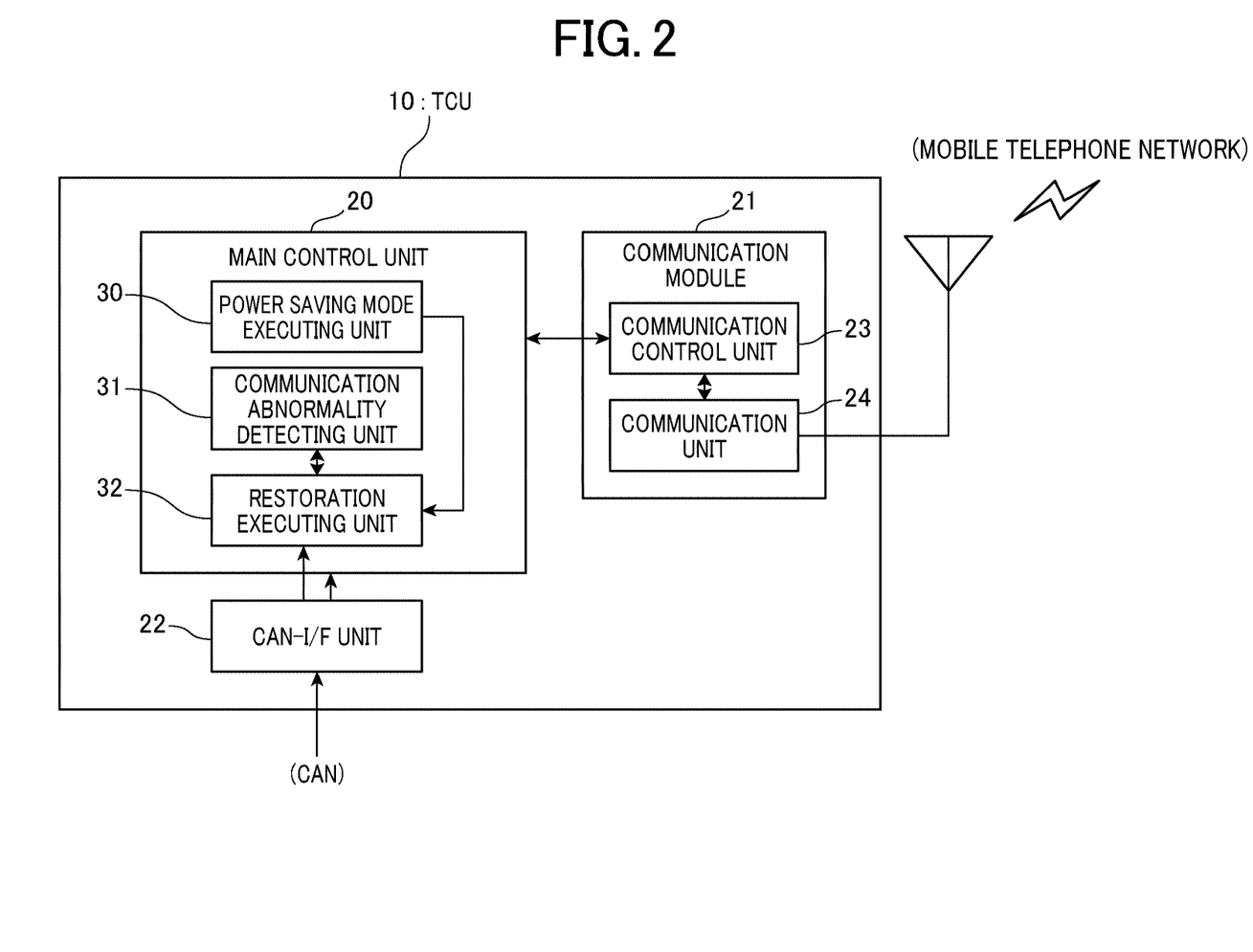
FIG. 2 is a diagram illustrating a functional configuration of a TCU.

FIG. 2 is a block diagram illustrating a functional configuration of the TCU 10.

As illustrated in FIG. 2, the TCU 10 includes a main control unit 20, a communication module 21 and a CAN-I/F unit 22.

The main control unit 20 which centrally controls the TCU 10, includes a CPU, a ROM, a RAM, or the like.

The communication module 21 which is a module having a function of performing communication (that is, mobile communication) through the mobile telephone network 3 under control of the main control unit 20, includes a communication control unit 23 and a communication unit 24. The communication control unit 23 which controls each unit of the communication module 21, includes a CPU, a ROM, a RAM, or the like. The communication unit 24 performs communication via the mobile base station 6 of the mobile telephone network 3 under control of the communication control unit 23. Further, the communication unit 24 has a function of detecting a radio wave state of a radio wave transmitted by the mobile base station 6, determining whether or not the vehicle 4 is located within a communication area of the mobile base station 6, and performing output in response to an inquiry from the main control unit 20 via the communication control unit 23.

The CAN-I/F unit 22 is an interface unit connected to the CAN 11. The main control unit 20 transmits/receives a signal with the electric component and the vehicle mounted equipment 9 through this CAN-I/F unit 22.

It should be noted that, when the telematics system 1 includes another mobile communication network in place of the mobile telephone network 3, the communication unit 24 of the TCU 10 is configured to be able to perform communication with a wireless access point of this mobile communication network.

The main control unit 20 of the TCU 10 includes a power saving mode executing unit 30. The power saving mode executing unit 30 makes an operation mode shift to a power saving mode (so-called, a sleep state) in which power consumption of each unit of the TCU 10 becomes minimum to suppress consumption of the battery when a power source (an engine or an electric motor) of the vehicle 4 is stopped. The power saving mode executing unit 30 returns the operation mode from the power saving mode to a normal operation mode when the power source is started.

Further, when the power saving mode executing unit 30 receives various kinds of communication such as a remote control command and an activation command from the server terminal 7 or when predetermined conditions in which it is determined that data is transmitted to the server terminal 7 are satisfied although the power source is stopped, the power saving mode executing unit 30 returns the operation mode to the normal operation mode. The predetermined conditions can include, for example, regular transmission of the own vehicle location information, or the like.

It should be noted that conditions for shifting to the power saving mode are not limited to that the power source of the vehicle 4 is stopped, and may be, for example, that the vehicle 4 is parked or that the power source is stopped and the vehicle 4 is parked.

By the operation mode of the TCU 10 shifting to the power saving mode during parking of the vehicle 4 in this manner, power consumption of the TCU 10 is suppressed. In addition, by employing a configuration where the operation mode of each electric component and the vehicle mounted equipment 9 to be remotely operated via the TCU 10 shifts to an operation mode in which standby power consumption is suppressed in response to shifting of the operation mode of the TCU 10 to the power saving mode, it is possible to suppress individual power consumption of these electric component and the vehicle mounted equipment 9, and suppress battery consumption during parking.

By the way, the TCU 10 may be unstable in operation. Factors of the TCU 10 being unstable can include, for example, influence of a reception environment such as unstable communication with the mobile base station 6 due to a fading phenomenon and hang-up of the communication module 21 due to transmission/reception of an excessive data amount.

Further, in the telematics system 1, there may be a case where a failure occurs not only at the TCU 10, but also respectively at the mobile telephone network 3 and the server terminal 7.

When a situation where data communication is impossible (hereinafter, referred to as a "communication abnormality") occurs at any of the TCU 10, the mobile telephone network 3 and the server terminal 7 in this manner, this may be an obstacle to provision of the telematics service.

Since there are various factors of occurrence of a communication abnormality at each of the TCU 10, the mobile telephone network 3 and the server terminal 7, it is unrealistic to examine all the individual factors in advance, which makes it difficult to construct a system with high stability in advance.

In addition, when the TCU 10 detects a communication abnormality, it is difficult to accurately determine whether the communication abnormality is caused by the communication module 21 or the mobile telephone network 3 or the server terminal 7 outside the TCU 10. That is, even when it is determined that the communication module 21 normally operates based on mutual communication between the main control unit 20 and the communication module 21 of the TCU 10, there is a case where, actually, the operation state of the communication module 21 is unstable, which causes a communication abnormality.

Further, in the telematics system 1, if a state where the TCU 10 faces a communication abnormality continues, there is a case where the operation mode does not shift to the power saving mode by the TCU 10 repeating operation of transmitting a service provision request to the server terminal 7. In this case, the battery remaining level for vehicle driving continues to be consumed by the electric component and the vehicle mounted equipment 9 as well as the TCU 10, which may cause running out of the battery.

For example, when the operation state of the mobile phone 5 become unstable, by the user performs restarting operation, or the like, of the mobile phone 5 to reset the operation state of the mobile phone 5, it is possible to improve the operation state of the mobile phone 5.

However, since the TCU 10 is normally disposed at a position where it is difficult to be recognized or operated by the user in the vehicle 4, it is difficult for the user to recognize the operation state of the TCU 10 and perform operation to reset the operation state as necessary.

Further, since the TCU 10 is connected to an electric component such as an ECU through the CAN 11, it is not preferable that the user can operate the TCU 10 unnecessarily.

Therefore, when the user tries to receive provision of the telematics service by utilizing the mobile phone 5 or the vehicle mounted equipment 9, but cannot normally receive service due to a communication abnormality, the user is less likely to notice that the communication abnormality is caused by the TCU 10. Moreover, when a communication abnormality occurs due to the TCU 10, the battery remaining level continues to be consumed without the mode of the TCU 10 shifting to the power saving mode, and the battery remaining level is not notified by the telematics service, there can be a case where the user notices that the battery remaining level is low when the user gets on the vehicle 4.

Therefore, in this telematics system 1, by the TCU 10 resetting the operation state of the communication module 21 when a state where communication via the communication module 21 to receive service cannot be performed (that is, the above-described communication abnormality) occurs, it is possible to reliably improve a communication abnormality due to an unstable operation state of the communication module 21, and realize more stable service provision.

More specifically, as illustrated in FIG. 2, the main control unit 20 of the TCU 10 includes a communication abnormality detecting unit 31 and a restoration executing unit 32.

The communication abnormality detecting unit 31 detects a communication abnormality of communication via the communication module 21. Specifically, as illustrated in FIG. 3, the communication abnormality detecting unit 31 detects a communication abnormality when a portion which does not respond (a portion to which communication connection cannot be performed through link establishment) occurs at any of the communication module 21, the mobile telephone network 3 and the server terminal 7.

The restoration executing unit 32 executes restoration operation when a communication abnormality is detected by the communication abnormality detecting unit 31. The restoration operation is performed by forcibly resetting the operation state of the communication module 21. As this resetting method, an arbitrary method can be used if the method is a method with which the operation state can be reset. The resetting method can include, for example, turning on/off a power supply of the communication module 21 and inputting a predetermined reset signal.

Figure 3:
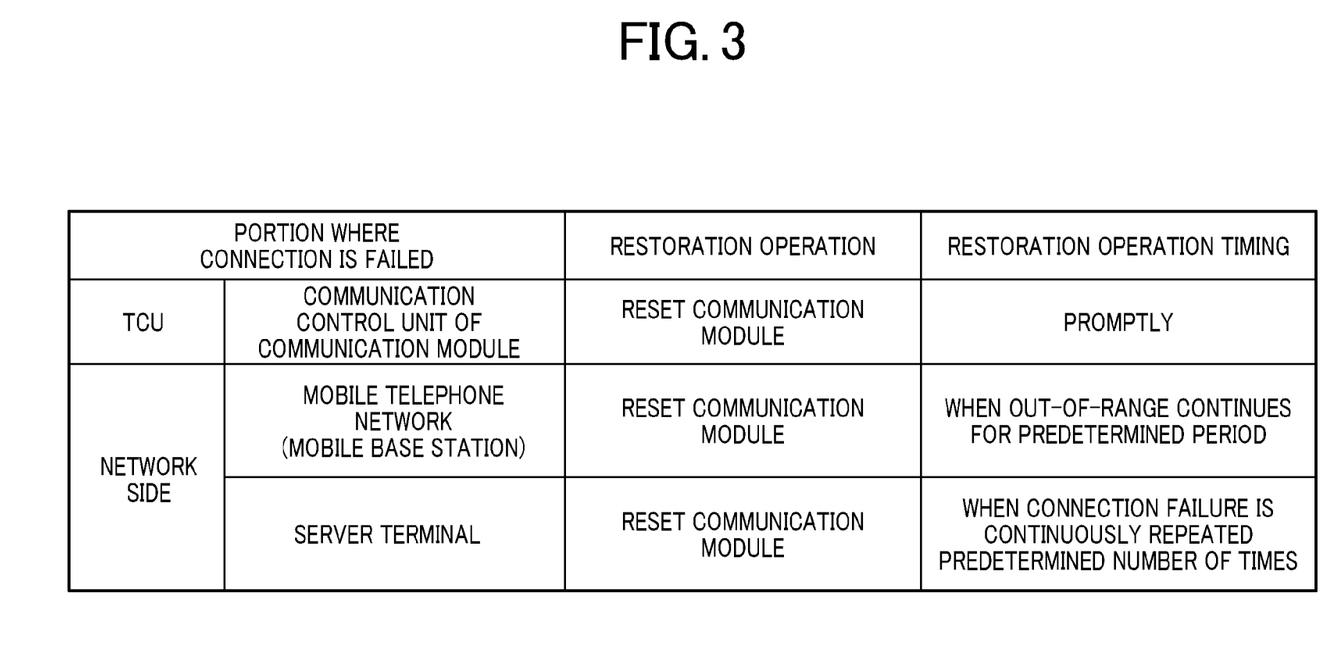
FIG. 3 is a diagram for explaining restoration operation when a communication abnormality is detected.

Further, even when a communication abnormality is detected, as illustrated in FIG. 3, the restoration executing unit 32 makes a timing for starting the restoration operation different according to a portion to which communication connection cannot be performed.

That is, in communication between the main control unit 20 and the communication control unit 23 of the communication module 21, when there is no response from the communication module 21 to the main control unit 20, it is highly likely that the operation state of the communication module 21 is unstable. In this case, the operation state of the communication module 21 is promptly reset to improve the operation state.

In communication between the TCU 10 and the mobile telephone network 3, when there is no response from the mobile telephone network 3 because, for example, a radio wave of the mobile base station 6 cannot be received (that is, when communication connection to the mobile telephone network 3 cannot be performed), it can be considered that the state becomes a so-called out-of-range state, and a reception state of a radio wave becomes poor due to a surrounding environment. In this case, the reception state is often improved when the vehicle 4 moves, or the like. However, when the out-of-range state continues and connection cannot be performed over a predetermined period, there is a higher possibility that the operation state of the communication module 21 is unstable, and thus the operation state of the communication module 21 is reset in this case.

Further, when there is no response from the server terminal 7 and communication connection to the server terminal 7 cannot be performed (communication connection is failed) in communication between the TCU 10 and the server terminal 7, this can be considered to be caused by temporal increase of load of the server terminal 7. However, when communication connection to the server terminal 7 continues to be failed over a predetermined number of times, there is a higher possibility that the operation state of the communication module 21 is unstable, and thus the operation state of the communication module 21 is reset also in this case.

By this restoration operation, when the operation state of the communication module 21 is obviously unstable, as well as under the conditions that it is estimated that a communication abnormality occurs due to the mobile telephone network 3 and the server terminal 7, when there is a higher possibility that the communication abnormality occurs due to an unstable operation state of the communication module 21, the operation state of the communication module 21 is reliably reset.

Further, in this TCU 10, stability of the operation of the communication module 21 is improved by resetting of the communication module 21 in advance when communication with the server terminal 7 occurs as well as when the communication abnormality detecting unit 31 detects a communication abnormality.

A timing of reset in advance includes at least when the mode is returned from the power saving mode to a normal operation timing by the power saving executing unit 30, and when a start key (so-called ignition key) of the power source (an engine or an electric motor) of the vehicle 4 is manipulated.

That is, the restoration executing unit 32 resets the operation state of the communication module 21 every time return from the power saving mode by the power saving mode executing unit 30 is detected and every time operation of the start key is input through the CAN 11.

A case where communication connection to the server terminal 7 cannot be performed and a case where communication connection to the mobile telephone network 3 cannot be performed will be described next as operation of this TCU 10.

Figure 4:
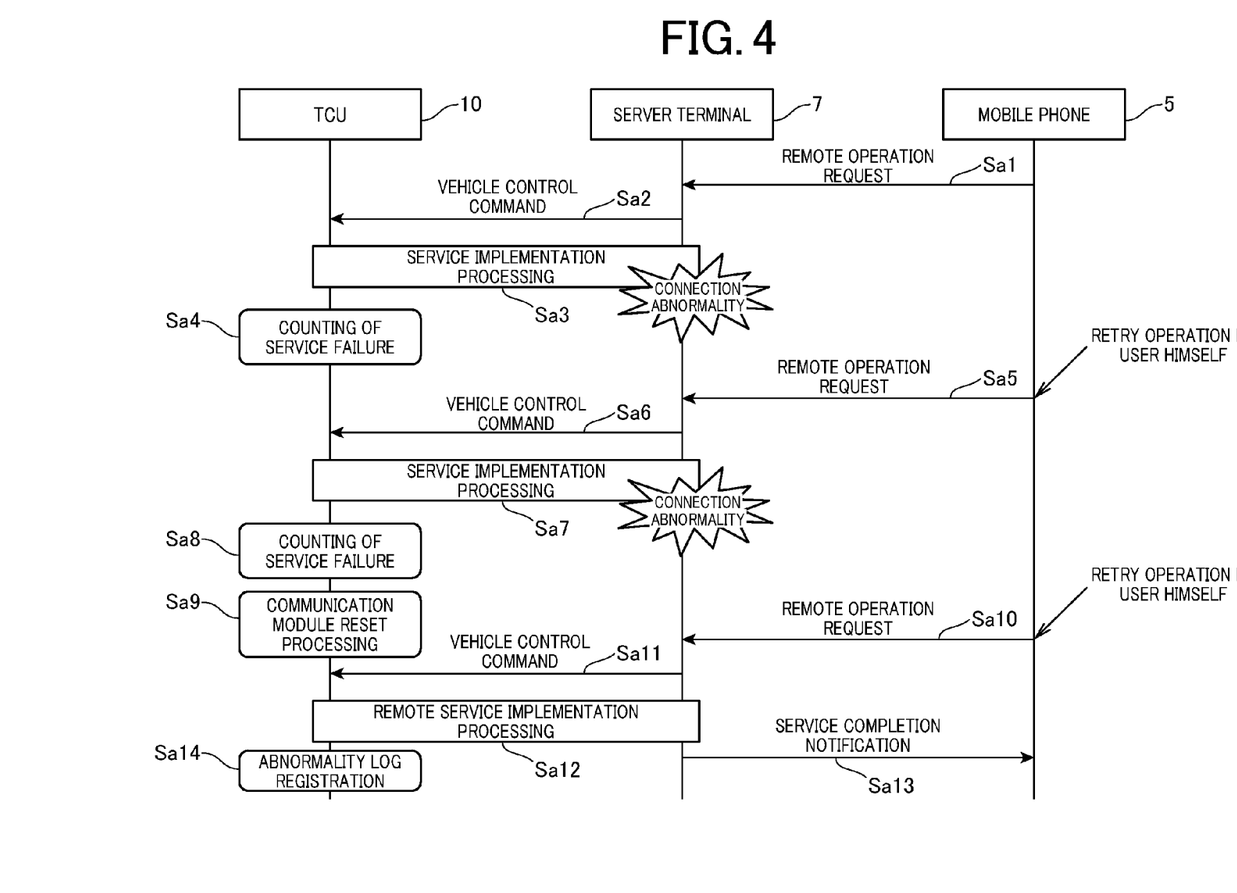
FIG. 4 is a sequence diagram illustrating an example of operation when communication connection to a server terminal cannot be performed.

FIG. 4 is a sequence diagram illustrating an example of operation when communication connection to the server terminal 7 cannot be performed. It should be noted that FIG. 4 illustrates a case where the user receives remote operation service of the vehicle 4.

In the remote operation service, the user transmits a remote operation request to the server terminal 7 from the mobile phone 5 through the mobile telephone network 3 (step Sa1). When the server terminal 7 receives the remote operation request, the server terminal 7 transmits a vehicle control command for executing this remote operation to the TCU 10 of the vehicle 4 of a target through the mobile telephone network 3 (step Sa2).

When the main control unit 20 of the TCU 10 receives the vehicle control command, the main control unit 20 executes operation commanded through remote operation by outputting the vehicle control command to an electric component or the vehicle mounted equipment 9 through the CAN 11 according to the vehicle control command (step Sa3: service implementation processing).

Further, in the service implementation processing in step Sa3, the main control unit 20 of the TCU 10 communicates with the server terminal 7 for acquisition of various kinds of data required for executing operation, notification of an operation result, or the like. When some failure occurs at the server terminal 7 at this communication timing, the communication abnormality detecting unit 31 detects a communication abnormality from a fact that no response can be obtained from the server terminal 7 and communication connection cannot be performed.

In this case, as described with reference to FIG. 3, in the TCU 10, when a failure of communication connection to the server terminal 7 continues to be repeated over a predetermined number of times, the restoration executing unit 32 resets the communication module 21.

That is, when a communication abnormality with the server terminal 7 is detected, the communication abnormality detecting unit 31 counts the number of times an abnormality is continuously detected (in other words, the number of times the service implementation processing is failed) (step Sa4).

Meanwhile, in this case, the mobile phone 5 of the user is not notified that the remote operation is normally performed. Therefore, when the user executes remote operation again using the mobile phone 5 (so-called, retry operation), a remote operation request is transmitted from the mobile phone 5 to the server terminal 7 (step Sa5), and a vehicle control command is transmitted from the server terminal 7 to the TCU 10 (step Sa6).

When the main control unit 20 of the TCU 10 receives the vehicle control command, the main control unit 20 executes operation commanded through remote operation again according to this vehicle control command (step Sa7: service implementation processing). At this time, when communication connection to the server terminal 7 cannot be performed again, communication connection to the server terminal 7 continues to be failed, and thus the communication abnormality detecting unit 31 counts up the number of times of failures (step Sa8).

When a count value of no-response of the server terminal 7 reaches a predetermined number of times, there is a higher possibility that a communication abnormality occurs due to the communication module 21 as well as due to the server terminal 7, and thus the communication abnormality detecting unit 31 outputs the communication abnormality to the restoration executing unit 32, and the restoration executing unit 32 resets the operation state of the communication module 21 (step Sa9).

Subsequently, the user executes remote operation again using the mobile phone 5, and a remote operation request is transmitted from the mobile phone 5 to the server terminal 7 (step Sa10), and, when a vehicle control command is transmitted from the server terminal 7 to the TCU 10 (step Sa11), if communication connection to the server terminal 7 is failed due to the communication module 21, communication between the TCU 10 and the server terminal 7 is normally performed in the service implementation processing (step Sa12).

When the operation commanded through remote operation is normally completed, the main control unit 20 of the TCU 10 transmits an operation result to the server terminal 7, and the server terminal 7 transmits a service completion notification to the mobile phone 5 based on this operation result (step Sa13). The user can confirm that the remote operation is performed by this service completion notification.

Further, the communication abnormality detecting unit 31 of the TCU 10 turns the counter value of the failure of the communication connection back to zero when communication with the server terminal 7 is normally performed, and, further, registers as a record that reset operation is performed by the communication connection to the server terminal 7 being failed in abnormality log information. This record of the abnormality log information makes it easy to take measures such as switching of the server terminal 7 to be connected when it is proved that there is an abnormality in the server terminal 7.

Figure 5:
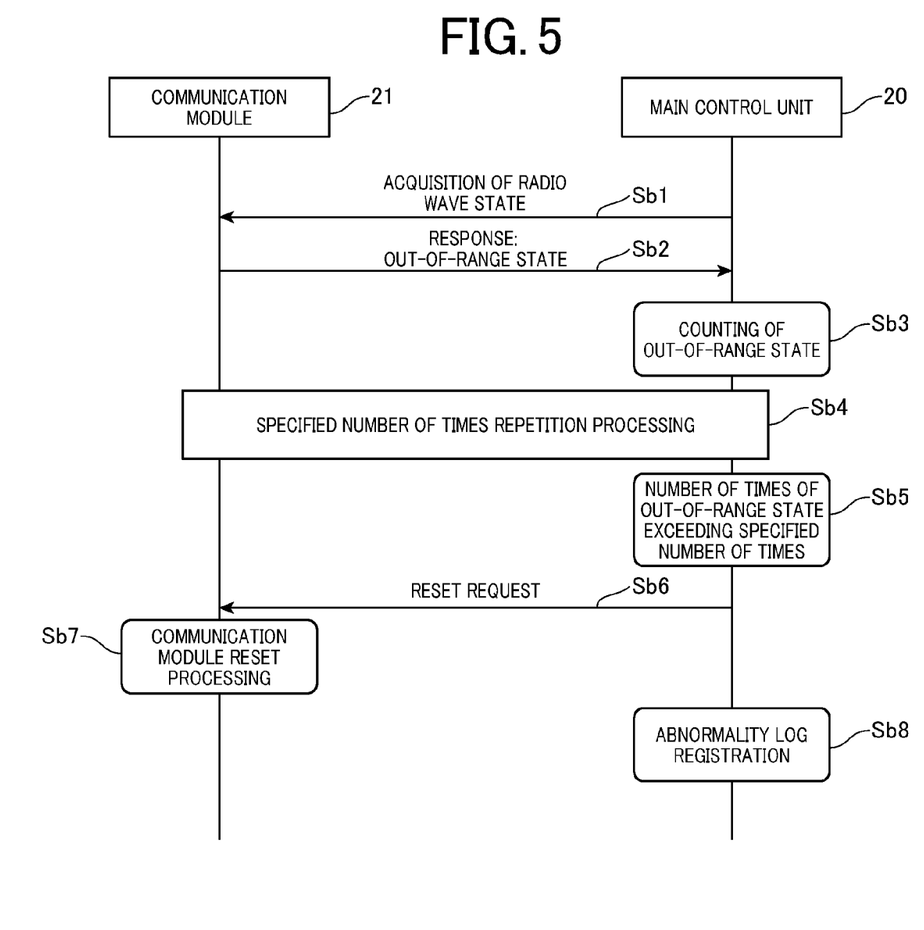
FIG. 5 is a sequence diagram illustrating an example of operation when communication connection to a mobile telephone network cannot be performed.

FIG. 5 is a sequence diagram illustrating an example of operation when communication connection to the mobile telephone network 3 cannot be performed.

When a communication abnormality occurs between the communication module 21 of the TCU 10 and the mobile base station 6 of the mobile telephone network 3, the communication module 21 cannot receive a radio wave from the mobile base station 6, and the state becomes a state where there is no response from the mobile telephone network 3 (so-called out-of-range) as viewed from the main control unit 20 of the TCU 10, and communication connection cannot be performed. In this case, as described with reference to FIG. 3, in the TCU 10, when the out-of-range state of the mobile telephone network 3 is continuously detected over a predetermined period, the restoration executing unit 32 resets the operation state of the communication module 21.

That is, as illustrated in FIG. 5, at the main control unit 20 of the TCU 10, the communication abnormality detecting unit 31 intermittently inquires the communication module 21 about a radio wave state and acquires the radio wave state to monitor the reception state of the radio wave (step Sb1). When the communication control unit 23 of the communication module 21 receives the inquiry about the radio wave state, the communication control unit 23 makes a response indicating either within-range or out-of-range, in this example, a response indicating out-of-range (step Sb2).

When the communication abnormality detecting unit 31 receives a response indicating out-of-range (that is, no response from the mobile telephone network 3) from the communication module 21, the communication abnormality detecting unit 31 counts the number of times a response indicating out-of-range is received to determine whether or not the out-of-range state is continued over a predetermined period (step Sb3). That is, the communication abnormality detecting unit 31 repeats the operation of inquiring the communication module 21 about the radio wave state at a fixed time interval until a response indicating within-range is received or the number of times of inquires reach a specified number of times (step Sb4).

When the number of times a response indicating out-of-range is received reaches the specified number of times (step Sb5), it indicates that the out-of-range state continues over the predetermined period, and thus there is a higher possibility that the communication abnormality occurs due to an unstable operation state of the communication module 21 as well as the reception environment of the radio wave. In particular, while the vehicle 4 is driving, the reception environment changes from moment to moment, and thus it is extremely highly likely that the operation state of the communication module 21 is unstable.

Therefore, the communication abnormality detecting unit 31 outputs the communication abnormality to the restoration executing unit 32, and the restoration executing unit 32 outputs a reset request to the communication module 21 (step Sb6) to reset the operation state of the communication module 21 (step Sb7).

Further, the communication abnormality detecting unit 31 of the TCU 10 registers as a record that the operation state of the communication module 21 is reset because the out-of-range state of the mobile telephone network 3 continues, in the abnormality log information (step Sb8).

As described above, according to the present embodiment, it is configured such that, when communication for receiving service cannot be performed, the main control unit 20 of the TCU 10 resets the operation state of the communication module 21.

This configuration reliably improves a communication abnormality due to an unstable operation state of the communication module 21, so that it is possible to stably receive service provision.

In addition, since, instead of the TCU 10 itself being reset, the main control unit 20 within the TCU 10 actively detects a communication abnormality and performs return operation, it is possible to make a period while the TCU 10 cannot be used as short as possible, and reduce loss of an opportunity for reception of service, so that it is possible to improve usability.

Further, according to the present embodiment, the main control unit 20 resets the operation state of the communication module 21 when connection to the mobile telephone network 3 cannot be performed over a predetermined period, when communication with the server terminal 7 is continuously failed over a predetermined number of times or when the communication module 21 does not respond.

By this means, also when it is estimated that a communication abnormality occurs due to the mobile telephone network 3 or the server terminal 7 judging from the situation as well as when the operation state of the communication module 21 is unstable, when it is highly likely that the communication abnormality occurs due to the communication module 21, it is possible to improve the communication abnormality by resetting the operation state of the communication module 21.

Further, according to the present embodiment, the main control unit 20 resets the operation state of the communication module 21 every time the mode is returned from the power saving mode.

By this means, it is possible to prevent a communication abnormality due to an unstable operation state of the communication module 21.

Further, according to the present embodiment, the main control unit 20 returns the mode from the power saving mode when communication transmitted from the server terminal 7 is received or when predetermined conditions in which it is determined that data is transmitted to the server terminal 7 are satisfied.

By this means, it is possible to receive service by returning the mode from the power saving mode at a timing when service provided by the server terminal 7 should be received. In addition, when the mode is returned from the power saving mode, a communication abnormality is prevented by resetting the operation state of the communication module 21, and thus it is possible to prevent occurrence of a case where processing relating to service implementation cannot be finished due to a communication abnormality occurring after the mode is returned from the power saving mode and thus the mode cannot shift to the power saving mode.

Further, according to the present embodiment, when the power source of the vehicle 4 is started, the main control unit 20 returns the mode from the power saving mode and resets the operation state of the communication module 21.

By this means, since the operation state of the communication module 21 is reset at a timing when the user drives the vehicle 4 and a communication abnormality is prevented, it is possible to prevent occurrence of a case where service cannot be received due to the operation state of the communication module 21 after the user gets on the vehicle 4.

Further, according to the present embodiment, the TCU 10 transmits/receives a signal with an electric component or the vehicle mounted equipment 9 connected to the CAN 11 through the CAN-I/F unit 22.

By this means, it is possible to realize service of remotely operating the electric component and the vehicle mounted equipment 9 through the server terminal 7 as service for a vehicle. Further, when a communication abnormality occurs, the TCU 10 resets the operation state of the communication module 21 without operation by the user, and thus it is possible to improve the communication abnormality without allowing the user to freely operate the TCU 10 which coordinates with the electric component or the vehicle mounted equipment 9.

Further, according to the present embodiment, since the telematics system 1 is configured to include the TCU 10, it is possible to reliably prevent a communication abnormality due to the communication module 21 of the TCU 10, so that it is possible to improve stability of the system.

It should be noted that the above-described embodiment is an example of one aspect of the present invention, and arbitrary modification and application are possible without departing from the scope of the present invention.

For example, in the above-described embodiment, after the main control unit 20 of the TCU 10 resets the operation state of the communication module 21 by being triggered by a communication abnormality with the server terminal 7, when a communication abnormality with the server terminal 7 is continuously detected, and, when there is a backup terminal of the server terminal 7, it is also possible to employ a configuration where the main control unit 20 switches a connection destination to this backup terminal.

By this means, when it is estimated that the communication abnormality occurs due to the server terminal 7, it is possible to further increase a success rate of service implementation.

REFERENCE SIGNS LIST 1 telematics system (service provision system)
3 mobile telephone network (mobile communication network)
4 vehicle
5 mobile phone
6 mobile base station
7 server terminal
8 vehicle mounted equipment
10 TCU (vehicle mounted communication unit)
11 CAN (vehicle mounted network)
20 main control unit (control unit)
21 communication module
22 CAN-I/F unit (interface unit)
30 power saving mode executing unit
31 communication abnormality detecting unit
32 restoration executing unit

The invention claimed is:

1. A vehicle mounted communication unit which communicates with a server terminal providing service for a vehicle via a mobile communication network for receiving provision of the service, the vehicle mounted communication unit comprising:
a main control unit configured to control the vehicle mounted communication unit and including a CPU, a ROM, and a RAM; and
a communication module including a communication control unit, which includes a CPU, a ROM, and a RAM, and a communication unit performing communication through the mobile communication network under control of the communication control unit,
wherein the main control unit includes
a communication abnormality detecting unit detecting a communication abnormality of the communication via the communication module when communication connection cannot be performed at any of plural elements including the server terminal, the mobile communication network, and the communication module, and
a restoration execution unit executing restoration operation performed by resetting an operation state of the communication module at a timing when the communication abnormality is detected by the communication abnormality detecting unit, and the restoration execution unit starting the restoration operation at a different timing depending on at which element communication connection cannot be performed.

2. The vehicle mounted communication unit according to claim 1,
wherein the restoration execution unit executes the restoration operation at the timing when connection to the mobile communication network cannot be performed over a predetermined period, when communication with the server terminal is failed over a predetermined number of times, or promptly when the communication module does not respond.

3. The vehicle mounted communication unit according to claim 1,
wherein a power saving mode in which power consumption is suppressed is provided as an operation mode, and
the restoration execution unit resets the operation state of the communication module every time the operation mode is returned from the power saving mode.

4. The vehicle mounted communication unit according to claim 3,
wherein the main control unit returns the operation mode from the power saving mode when communication transmitted from the server terminal is received or when predetermined conditions in which it is determined that data is transmitted to the server terminal are satisfied.

5. The vehicle mounted communication unit according to claim 3,
wherein the main control unit makes the operation mode shift to the power saving mode when a power source of the vehicle is stopped, and
the main control unit returns the operation mode from the power saving mode and resets the operation state of the communication module when the power source is started.

6. The vehicle mounted communication unit according to claim 1, further comprising:
an interface unit connected to a vehicle mounted network provided at the vehicle,
wherein a signal is transmitted/received to/from an electric component or vehicle mounted equipment connected to the vehicle mounted network through the interface unit.

7. A service provision system comprising:
a server terminal providing service for a vehicle; and
a vehicle mounted communication unit communicating with the server terminal via a mobile communication network for receiving provision of the service,
wherein the vehicle mounted communication unit includes
a main control unit configured to control the vehicle mounted communication unit and including a CPU, a ROM, and a RAM; and
a communication module including a communication control unit, which includes a CPU, a ROM, and a RAM, and a communication unit performing communication through the mobile communication network under control of the communication control unit,
wherein the main control unit includes
a communication abnormality detecting unit detecting a communication abnormality of the communication via the communication module when communication connection cannot be performed at any of plural elements including the server terminal, the mobile communication network, and the communication module, and
a restoration execution unit executing restoration operation performed by resetting an operation state of the communication module at a timing when the communication abnormality is detected by the communication abnormality detecting unit, and the restoration execution unit starting the restoration operation at a different timing depending on at which element communication connection cannot be performed.

8. The service provision system according to claim 7, wherein
the main control unit has a power saving mode in which power consumption is suppressed as an operation mode, and
the restoration execution unit resets an operation state of the communication module every time the operation mode is returned from the power saving mode.

* * * * *